(12) United States Patent
Yamanaka et al.

(10) Patent No.: US 6,378,594 B1
(45) Date of Patent: Apr. 30, 2002

(54) ROLL SCREEN

(75) Inventors: Hiroomi Yamanaka; Ken-ichiro Egami; Masayuki Akimoto, all of Tokyo (JP)

(73) Assignee: Kabushiki Kaisha Nichibei, Tokyo (JP)

(*) Notice: Subject to any disclaimer, the term of this patent is extended or adjusted under 35 U.S.C. 154(b) by 0 days.

(21) Appl. No.: 09/199,461

(22) Filed: Nov. 25, 1998

(30) Foreign Application Priority Data

Nov. 27, 1997 (JP) .............................................. 9-326107

(51) Int. Cl.[7] ................................................ A47G 5/02
(52) U.S. Cl. ....................................................... 160/238
(58) Field of Search ................................ 160/310, 291, 160/296, 305, 298, 294; 192/129, 216, 141

(56) References Cited

U.S. PATENT DOCUMENTS

| | | | | | |
|---|---|---|---|---|---|
| 626,577 A | * | 6/1899 | Sturgis | ........................ | 160/296 |
| 1,342,017 A | * | 6/1920 | Fox | .............................. | 160/296 |
| 2,122,670 A | * | 7/1938 | Wilson | ........................ | 160/296 |
| 4,059,339 A | | 11/1977 | Brown | ........................ | 350/117 |
| 4,372,432 A | * | 2/1983 | Waine et al. | .................. | 192/12 |
| 4,751,953 A | * | 6/1988 | Appel et al. | .................. | 160/313 |
| 4,850,418 A | * | 7/1989 | Bresson | ....................... | 160/310 |
| 5,044,417 A | * | 9/1991 | Bresson | ....................... | 160/310 |
| 5,167,269 A | * | 12/1992 | Abo | ............................. | 160/305 |
| 5,351,743 A | * | 10/1994 | Jackson | ....................... | 160/310 |
| 5,507,374 A | * | 4/1996 | Rude | ............................ | 160/298 |
| 5,542,464 A | * | 8/1996 | Shiina | .......................... | 160/296 |
| 5,743,320 A | * | 4/1998 | McKeon | ...................... | 160/291 |
| 5,811,139 A | * | 9/1998 | Hehl | ............................ | 425/590 |
| 5,853,040 A | * | 12/1998 | Benthin | ....................... | 160/291 |

FOREIGN PATENT DOCUMENTS

| | | |
|---|---|---|
| JP | 56-135835 | 10/1981 |
| JP | 57-24931 | 2/1982 |
| JP | 4-284439 | 10/1992 |
| JP | 8-15776 | 1/1996 |

* cited by examiner

*Primary Examiner*—Curtis Cohen
(74) *Attorney, Agent, or Firm*—McGinn & Gibb, PLLC

(57) ABSTRACT

A roll screen comprises side plates, a winding pipe rotatably supported on the side plates, a spring mounted in the winding pipe, a screen to be wound on the winding pipe by the accumulated force of the spring, and a brake mounted in the winding pipe for decreasing a winding speed of the screen from a final stage of the winding of the screen. The clutch case is engaged with the brake from a final stage of the winding of the screen, and the brake is operated so that the winding speed of the screen can be decreased.

16 Claims, 6 Drawing Sheets

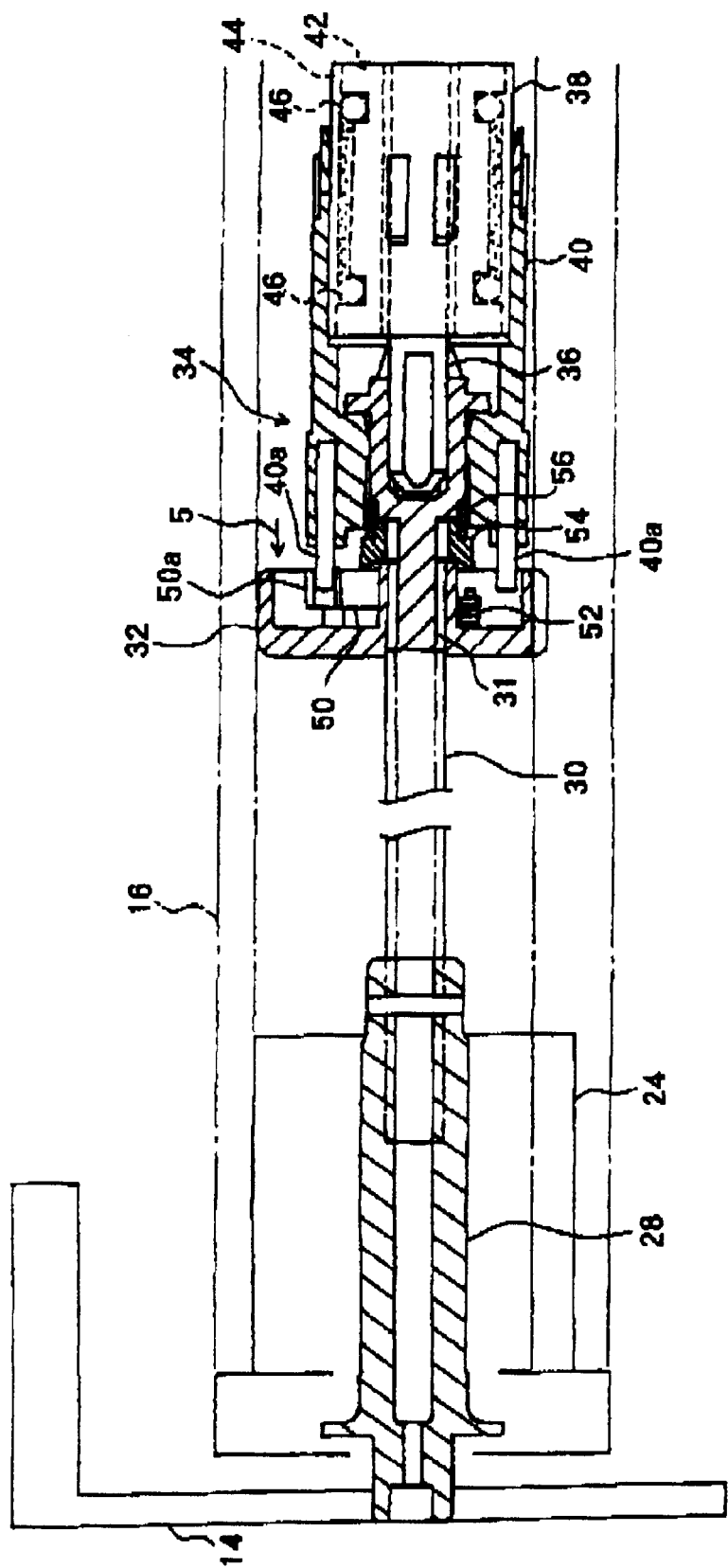

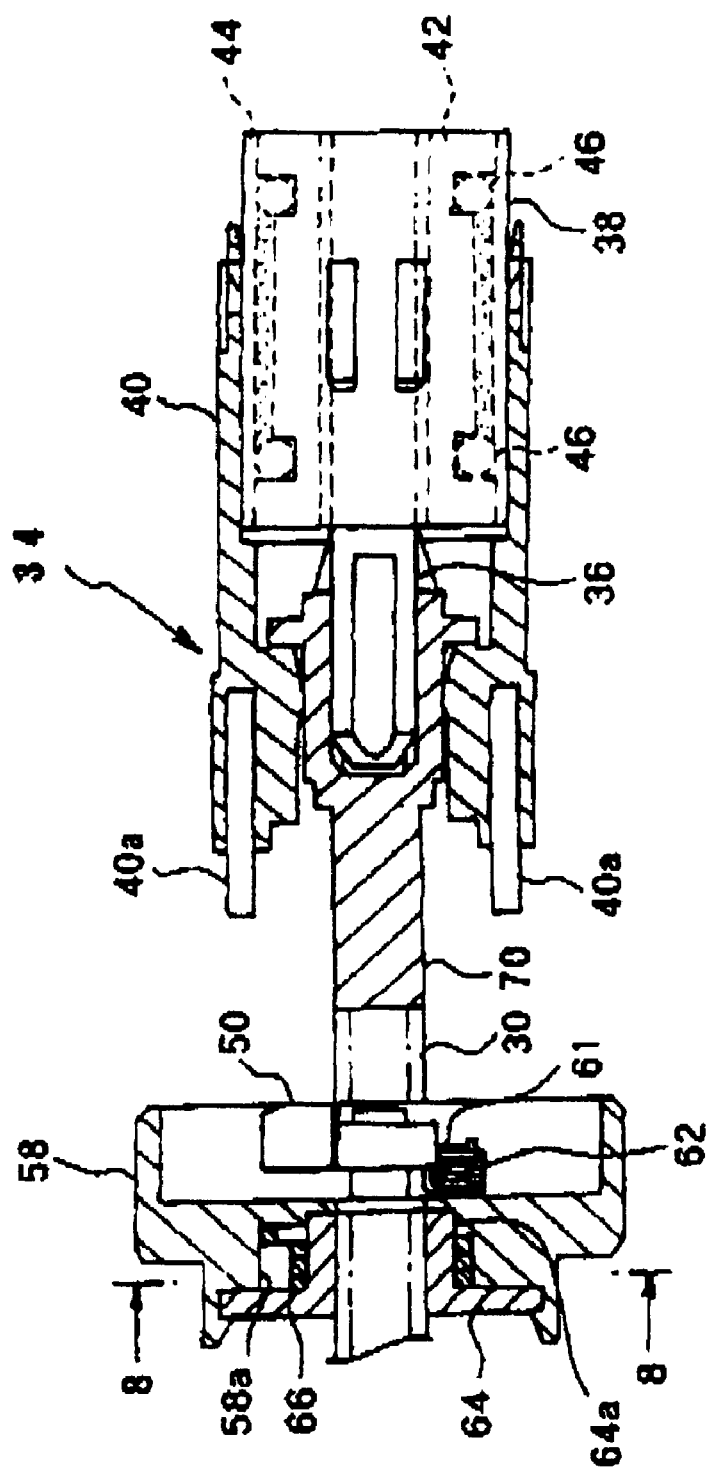

ROLL SCREEN

BACKGROUND OF THE INVENTION

1. Field of the Invention

The present invention relates to a roll screen, particularly to a roll screen in which a winding speed of the screen can be decreased.

2. Description of the Related Art

A conventional roll screen has been disclosed in, for example, Published Unexamined Utility Model Application No. 26316 of 1983(Showa 58).

This screen comprises a static screw which is securely arranged on a rotating axis for a winding pipe of a screen, a moving couple which is moved along the static shaft together with the rotation of the winding pipe, and a hydraulic damper mounted in the winding pipe. The hydraulic damper is provided with a piston rod and a piston which are moved in an axial direction together with the moving coupler, a cylinder secured to the winding sleeve, and oil filled in the cylinder. When the oil in the hydraulic damper is pressed by the piston rod moved together with the winding of the screen, a winding speed of the screen is decreased.

In the screen provided the above described brake mechanism, since the winding damper is always operated during the winding of the screen except a starting stage of the winding of the screen, a winding speed of the screen is decreased after the starting stage. In a final stage of the winding of the screen, since the winding diameter of the screen already wound becomes larger and a weight of a screen to be wound is reduced, a winding speed cannot be well controlled. Therefore, there is a problem that when the screen is completely wound, a crashing sound caused by a weight bar attached at the bottom of the screen is generated, and an impulse force is excessively increased.

Further, in the above described roll screen, the hydraulic damper is always operated even if the screen is wound from the intermediate position in a vertical direction and a winding speed of the screen is not so fast in a final stage of the winding of the screen. If the winding speed of the screen is so decreased to excess by the hydraulic damper, the screen cannot be wound to the end.

Further, in the above described roll screen, a winding speed of the screen is also decreased in the rewinding of the screen because an oil flow is always generated in the hydraulic damper. Therefore, there is a problem that if more than one brake means same as the above were mounted in the winding pipe to operate together, a winding speed of the screen would be decreased to excess in the rewinding of the screen, and its operation would become bad.

The present invention was made in consideration of the above-described problems. An object of the invention is to provide a roll screen in which a crashing sound and an impulse force caused by a weight bar in a final stage of the winding of the screen can be relieved.

Other object of the invention is to provide a roll screen in which the winding speed of the screen is not so decreased that the screen can still be wound to the end.

Further object of the invention is to provide a roll screen in which a winding speed of the screen can be decreased only in a final stage of winding.

SUMMARY OF THE INVENTION

To achieve the above-mentioned objects, in a roll screen according to the present invention, a spring is mounted within a winding pipe rotatably supported on side plates and a screen is wound on the winding pipe by an accumulated force of the spring. A brake is mounted in the winding pipe to decrease a winding speed of the screen only from a final stage of the winding of the screen.

Since a winding speed of the screen is decreased from the final stage of the winding of the screen, it is possible to relieve a crashing sound and an impulse force in a final stage of the winding of the screen.

Preferably, a second brake can be mounted in the winding pipe for decreasing a winding speed of the screen from a starting stage of the winding of the screen. Thereby, a screen can be decreased effectively by the operation of the two brakes.

Alternatively, the roll screen according to the present invention can be formed in such a manner that the brake can decrease a winding speed of the screen only when a winding speed of the screen is more than a given level. Thereby, the winding speed of the screen is not so excessively decreased that the screen can be still wound to the end.

The roll screen according to the present invention may be formed in such a manner that the brake comprises a screw shaft fixedly supported on the side plate, a clutch case which is mounted in the winding pipe so as to be movable in the axial direction but unrotatable relative to the winding pipe and which can be moved along the screw shaft together with rotating of the winding pipe, and a brake section disposed on an end side of the screw shaft. The clutch case is engaged with the brake section from a final stage of the winding of the screen to operate the brake section. The roll screen according to the present invention may be formed in such a manner that the brake section can further comprise a rotary brake and a brake case which houses the rotary brake and has a brake pin which extends in the axial direction toward the clutch case. When the clutch case is engaged with the brake pin, the rotary brake is rotated to operate. The winding speed of the screen can be surely decreased only when in a final stage of the winding of the screen, since the clutch case is moved along the screw shaft to be engaged with the brake section in the final stage of the winding of the screen.

Further, the roll screen according to the present invention may be formed in such a manner that the clutch case comprises a clutch piece having one end side rotatably attached to a body of the clutch case and another end side provided with an engaging portion to be engaged with the brake pin, a spring which always pushes the another end side of the clutch piece toward an outside of the clutch case. The engaging portion can be engaged with the brake pin only when the clutch case is rotating in the direction of the winding of the screen. Thereby, when the clutch case is rotating in the rewinding direction, the brake does not operate, since the clutch piece is swingable to dodge to the inside of the clutch case so as to escape from the brake pin against the spring. Therefore, the winding speed of the screen can decreased only when the clutch case is rotating in the winding direction of the screen.

Alternatively, the roll screen according to the present invention may be formed in such a manner that the clutch case comprises a clutch piece having one end side rotatably attached to a body of the clutch case and another end side provided with an engaging portion to be engaged with the brake pin, a spring which always pushes the another end of the clutch piece toward the center axis side of the clutch case. Only when a winding speed of the screen is more than a given level, the clutch piece is moved against a spring force of the spring by a centrifugal force generated by the rotation of the winding pipe. The clutch piece is moved toward the outside direction of the clutch case and the engaging portion of the clutch piece is engaged with the brake pin. Thereby, the winding speed of the screen is decreased only when the winding speed of the screen is more than the given level. Accordingly, the winding speed of the screen is not so excessively decreased that the screen can be still wound to the end. Alternatively, a positioning mechanism may be provided to position the clutch case in an axial direction relative to the winding pipe when the screen is completely wound.

The positioning mechanism can include a nonscrew shaft which is formed integrally with the screw shaft and has no thread. The clutch case is moved from the screw shaft to the nonscrew shaft immediately before a screen is completely wound. Further, the positioning mechanism can include a push spring for pushing back the clutch case on the nonscrew shaft toward the screw shaft.

Alternatively, the positioning mechanism can include a nonscrew shaft portion which is formed at an end portion of the screw shaft and prevents the movement of the clutch case, and a clutch spring mounted inside of the clutch case and inserted between a slip ring engaged with said screw shaft and the clutch case. The clutch spring makes the clutch case idle in the winding direction of the winding pipe at the end portion of the screw shaft relative to the slip ring.

The present invention disclosure relates to subject matter contained in Japanese Patent Application No. 9-326107, filed Nov. 27, 1997, which is expressly incorporated herein by reference in its entirety.

BRIEF DESCRIPTION OF THE DRAWINGS

The foregoing and other purposes, aspects and advantages will be better understood from the following detailed description of preferred embodiments of the invention with reference to the drawings, in which:

FIG. 4 is a view corresponding to FIG. 2 showing the action of the roll screen shown in FIG. 1;

FIG. 7 is a sectional view of an important part of a roll screen according to a third embodiment of the invention;

DETAILED DESCRIPTION OF THE PREFERRED EMBODIMENT OF THE INVENTION

Referring now to FIGS. 1 to 5, there is shown a preferred embodiment according to the present invention.

Figure 1:
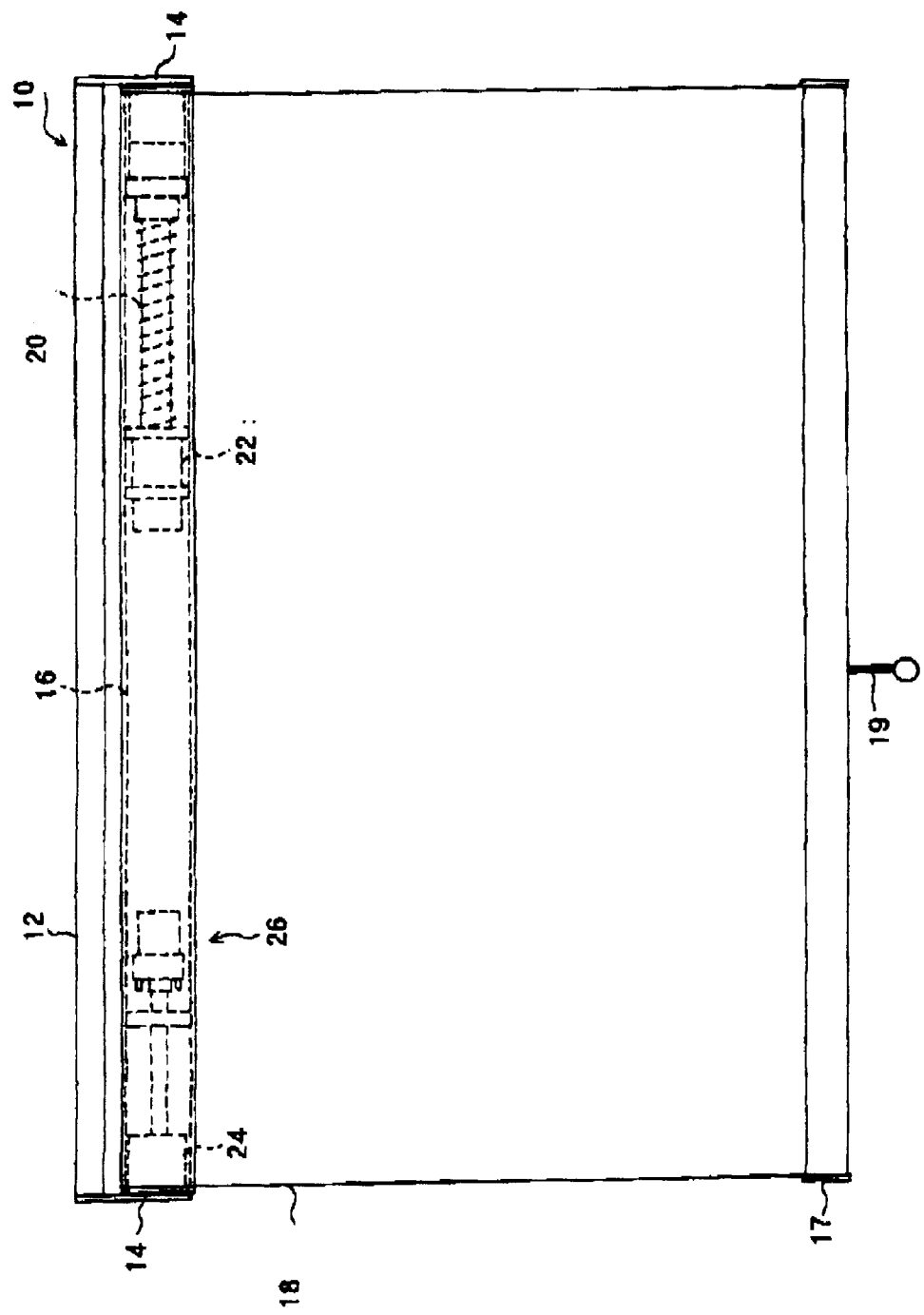
FIG. 1 is a front view of a roll screen according to a first embodiment of the invention.

FIG. 1 shows a roll screen according to an embodiment of the invention. Roll screen 10 mainly comprises a set frame 12 secured to a window frame and others, a pair of side plates 14 attached to the set frame 12, a winding pipe 16 rotatably supported to the side plates 14, a screen 18, a weight bar 17 attached to the lower end of the screen 18, and a pull device 19 attached to the lower end of the screen 18. One end of the screen 18 is connected with the winding pipe 16. The screen 18 is hung from the winding pipe 16 so as to be wound on or rewound from the winding pipe 16.

A coil spring 20 is mounted within the winding pipe 16. One end of the coil spring 20 is fixed to the side plate 14 indirectly, and the other end of the coil spring 20 is fixed to the winding pipe 16. If the winding pipe 16 is rotated in the rewinding direction of the screen, the other end of the coil spring 20 is rotated together with the winding pipe 16 so that a spring force is accumulated within the coil spring 20. If the winding pipe 16 is allowed to rotate in the winding direction of the screen 18, the screen 18 is wound around the winding pipe 16 by the accumulated spring force of the coil spring 20. A brake 22 is mounted within the winding pipe 16 to always decrease a winding speed of the screen 18.

Further, a stopper device 24 is provided within the winding pipe 16 which stops a rotation of the winding pipe 16 against the accumulated spring force of spring 20 to stop screen 18 at a desired position.

Further, a second brake 26 is provided within the winding pipe 16 for decreasing a winding speed of the screen from a final stage of the winding of the screen.

Figure 2:
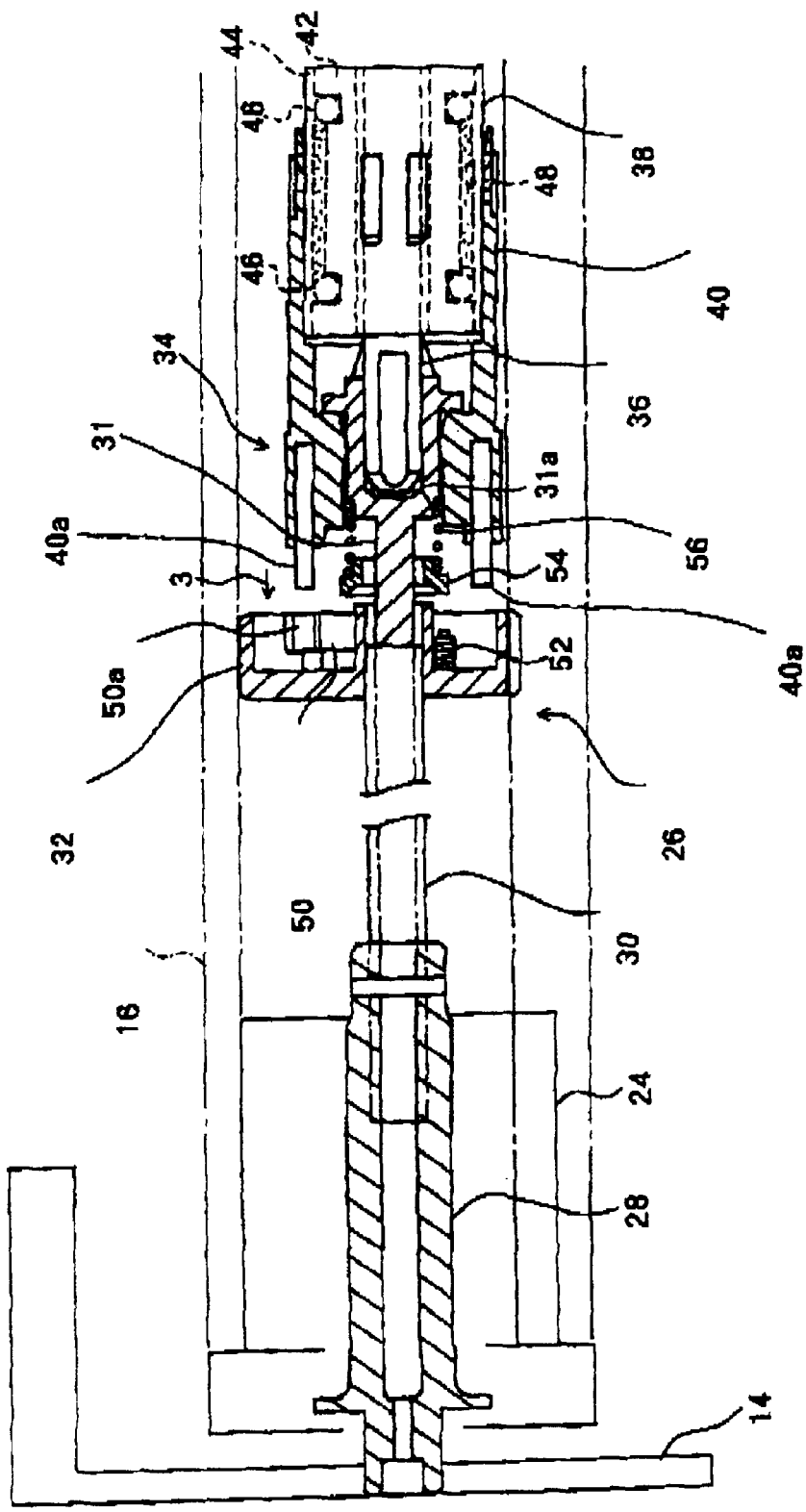
FIG. 2 is a sectional view of an important part of the roll screen shown in FIG. 1.

As shown in detail in FIG. 2, the second brake 26 comprises a screw shaft 30 fixedly supported to the side plate 14 through a stopper shaft 28 fixed to side plate 14, a clutch case 32 being moved along the screw shaft 30 together with the rotation of winding pipe 16, and a brake section 34 which is provided on one end side of screw shaft 30. The clutch case 32 is formed with groove portions 32a, 32b (see FIG. 3). The groove portions 32a, and 32b are engaged with a plurality of projecting portions which project in the direction of the inner diameter of the winding pipe 16 and extend in a longitudinal direction so that the clutch case 32 can move in the longitudinal direction but cannot rotate relative to the winding pipe 16. Further, a central hole of clutch case 32 is screwed to be threadably engaged with the screw shaft 30. Accordingly, as the winding pipe 16 rotates, the clutch case 32 is rotated together with the winding pipe 16 and is moved on screw shaft 30 along a thread of the screw shaft 30 in the longitudinal direction of the winding pipe 16. In FIG. 2, when the winding pipe 16 is rotated in the rewinding direction of the screen, the clutch case 32 is moved in the left direction. On the other hand, when the winding pipe 16 is rotated in the winding direction of the screen, the clutch case 32 is moved in the right direction. The screw shaft 30 is formed integrally with a unthreaded shaft 31 having no thread and a circular section. An outer diameter of the unthreaded shaft 31 is set to be equal to an outer diameter of a bottom portion of the thread of the screw shaft 30. Further, the clutch case 32 is set to be positioned out of screw shaft 30 but positioned on the unthreaded shaft 31 when the screen 18 is completely wound on winding pipe 16. Further, a push plate 54 is provided on the outside of the unthreaded shaft 31. A push spring 56 is inserted between the push plate 54 and an expanding portion 31a formed with the nonscrew shaft 31 on an opposite side to screw shaft 30. As described hereinafter, the nonscrew shaft 31 and the push spring 56 form a positioning mechanism for positioning the clutch case 32 in the axial direction within winding pipe 16.

A brake section 34 mainly includes a rotary brake 38 and a brake case 40 which houses the rotary brake 38 and has brake pins 40a extending in the axial direction toward a side of clutch case 32. The brake pins 40a are provided at two positions 180 degrees away from each other in the circumferential direction.

The rotary brake 38 is attached to a fixed shaft 36 fixedly supported to side plate 14 through the nonscrew shaft 31, the screw shaft 30 and the stopper shaft 28, The rotary brake 38 is formed of, for example, an oil brake. In detail, the oil brake is comprised of a stator 42 fixed to the fixed shaft 36, a rotor 44 arranged on the outer side of the stator 42 and fixed to the brake case 40, two O-rings 46 fitted between the outer side of the stator 42 and an inner side of the rotor 44 and arranged away from each other, and viscous fluid 48, such as silicon oil, filled within a space defined by the two O rings 46, 46, the outer side of stator 42 and the inner side of rotor 44.

Figure 3:
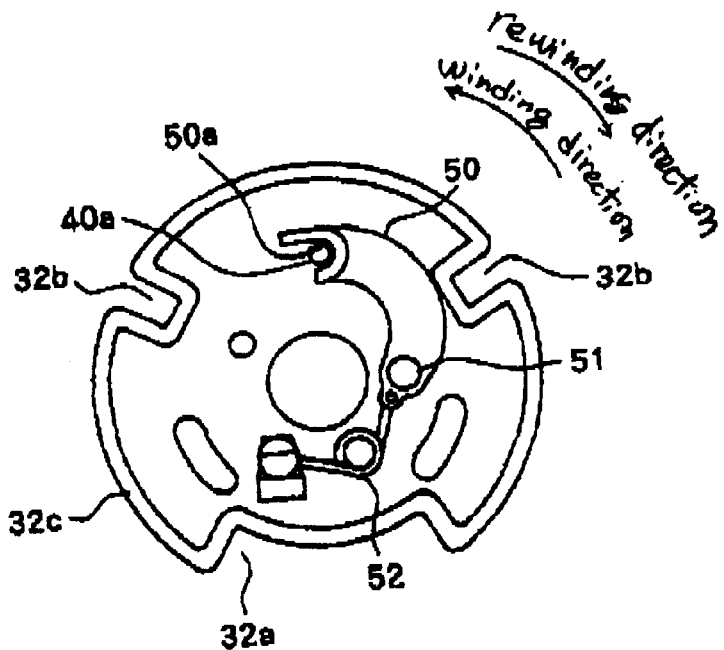
FIG. 3 is a view taken from a direction of arrow 3 of the clutch case shown in FIG. 2.

As shown in FIG. 3, the clutch case 32 includes a clutch piece 50 rotatably attached to a body 32c of the clutch case 32 by a pin 51, and a torsion coil spring 52 which always pushes the clutch piece 50 in such a direction that the clutch piece is opened toward the outside of the clutch case 32. Namely, the clutch piece 50 is swingable about the pin 51. The torsion coil spring 52 always pushes one end of the clutch piece 50 toward a center axis of the clutch case 32, so that the other end of the clutch piece 50 is brought into contact with the inner wall of the groove 32b by the torsion coil spring 52 in a normal state and the clutch piece 50 is opened toward the outside of the clutch case 32. The other end of the clutch piece 50 is formed with a concave engaging portion 50a to be engaged with the brake pin 40a. A relation between relative radial positions of the clutch piece 50 and brake pin 40a are set in such a manner that the engaging portion 50a of the clutch piece 50 can be engaged with the brake pin 40 when the clutch piece 50 is opened toward the outside of the clutch case 32. Further, a direction of a concave opening of the engaging portion 50a is set in such a manner that the engaging portion 50a can be engaged with the brake pin 40a only when the clutch case 32 is rotating together with the winding pipe 16 in the winding direction of the screen. When the clutch 32 is rotating in the rewinding direction of the screen, the brake pin 40a moves along a circular outer periphery of the clutch piece 50, and the clutch piece 50 is swung toward the inside against the spring force of the torsion coil spring 52, thus the engaging portion 50a of the clutch piece 50 cannot be engaged with the brake pin 40a.

The first brake 22 can be formed of an oil brake in the same manner as the rotary brake 38.

The action of the roll screen is described hereinafter.

When the screen 18 is rewound from the winding pipe 16 by pulling pull device 19 attached to the lower end of the screen 18, the screen 18 is lowered as the winding pipe 16 rotates. A spring reaction force is accumulated in the coil spring 20 by the rotation of the winding pipe 16. The winding pipe 16 is rotated while the rotation speed of winding pipe 16 is decreased by the first brake 22. After the screen 18 is lowered to a desired height, the stopper device 24 is operated to stop the rotation of winding pipe 16 against the accumulated force of the coil spring 20, thereby the screen 18 is stopped.

Now, if the stopper device 24 is released in order to raise the screen 18, then the winding pipe 16 is rotated in the winding direction of the screen by the accumulated force of coil spring 20, by which the screen 18 is wound. The first brake 22 decreases the winding speed of winding pipe 16. However, if only the first brake 22 continuously operates, the winding speed of the screen would be accelerated in a final stage of the winding of the screen 18, and a crushing sound and an impulse force caused by weight bar 17 would be excessively increased when the screen 18 is completely wound. Therefore, second brake 26 is operated in a final stage of winding.

In detail, the clutch case 32 is moved along the screw shaft 30 in the right direction in FIG. 2 together with the rotation of the winding pipe 16 in the winding direction of the screen 18. However, in a final stage of winding, namely when a rest remains 2 or 3 turns, the clutch case 32 arrives at a position where the clutch case 32 is engaged with the brake pin 40 as shown in FIG. 4. In the final stage of winding, the engaging portion 50a of the clutch piece 50 provided within the clutch case 32 is engaged with any of the two brake pins 40a while being rotated. Accordingly, since the brake case 40 and the rotor 44 are rotated together with the clutch case 32 and the winding pipe 16. On the other hand, the stator 42 remains fixed. The rotation speed of winding pipe 16 is decreased through the rotor 44 by a viscous resistance of viscous fluid 48 filled between the rotor 44 and the stator 42. In such a way, the second brake 26 in the final stage of winding makes a crushing sound and an impulse force caused by the weight bar 17 be reduced by decreasing the winding speed of the screen 18.

The clutch case 32 is moved along the screw shaft 30 while the clutch piece 50 of the clutch case 32 is engaged with and simultaneously slides along the brake pin 40a until the screen 18 is completely wound. Then, immediately before the screen 18 is completely wound, the clutch case 32 is moved from the screw shaft 30 toward the nonscrew shaft 31, and idles around the nonscrew shaft 31. For example, if a position of the clutch case 32 in the axial direction within the winding pipe 16 deviates from the designed position, the clutch case 32 is moved from the screw shaft 30 to the nonscrew shaft 31 well before the screen 18 is completely wound. The clutch case 32 idles around the nonscrew shaft 31 more turns than usual. When the screen 18 is completely wound finally, the clutch case 32 is always positioned at a point on the nonscrew shaft 30 to which the clutch case 32 is moved from the screw shaft 30. When the winding pipe 16 is rotated in the rewinding direction of the screen, the clutch case 32 is pushed toward the screw shaft 30 by the push plate 54 so that it engages the screw shaft 30 and is moved in the left direction in FIG. 2 and FIG. 4. In such a way, the position of clutch case 32 is corrected.

In the rewinding process of the screen, since the clutch case 32 is rotated in the reverse direction to the direction in the above-described case, the engagement of the engaging portion 50a of the clutch piece 50 with the brake pin 40a is released and the clutch piece 50 dodges the brake pin 40a to the outside. After rotating 2 or 3 turns, the clutch case 32 is completely released from the brake pin 40a, and is moved along the screw shaft 30 in the direction departing from the brake section 34.

As above described, the second brake 26 is operated only in a final stage of the winding of the screen.

Figure 5:
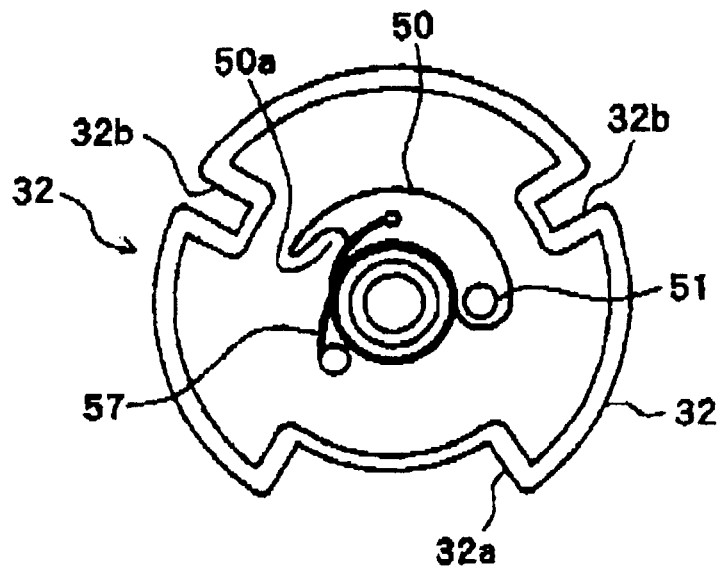
FIG. 5 is a view corresponding to FIG. 3 showing other embodiment of clutch case.
Figure 6:
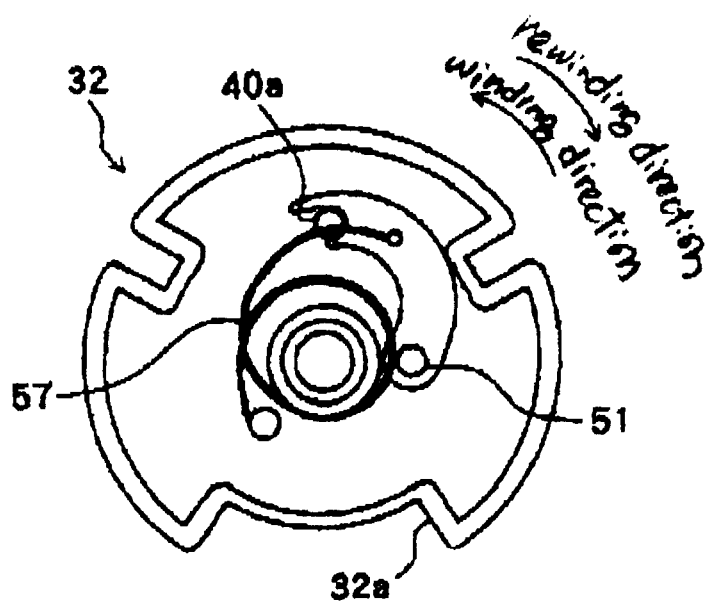
FIG. 6 is a view corresponding to FIG. 3 showing the other embodiment of clutch case.

FIG. 5 and FIG. 6 are a view corresponding to FIG. 3 showing another embodiment of the clutch case.

The clutch case 32 includes a clutch piece 50 rotatably attached to a body 32c of the clutch case by a pin 51, and a spiral spring 57 for always pushing the clutch piece 50 in such a direction that the clutch piece 50 is closed toward the center axis of the clutch case 32. The clutch piece 50 is swingable about the pin 51 so that the clutch piece 50 can be opened to the maximum until the clutch piece 50 is brought into contact with an inner wall of the groove 32b. Concerning the clutch piece 50, as shown in FIG. 6, a relation between a relative radial positions of the clutch piece 50 and the brake pin 40a is set in such a manner that the engaging portion 50a of the clutch piece can be engaged with the brake pin 40a when the clutch piece 50 is opened to the maximum.

In the clutch case 32 formed in such a manner, when the winding speed of the screen 18 is more than a given speed in a final stage of winding, as shown in FIG. 6, the clutch piece 50 within the clutch case 32 is opened toward the outside of the clutch case 32 against the spring force of spiral spring 57 by a centrifugal force so that the engaging portion 50a is engaged with any of two brake pins 40a while rotating. Thereby, the winding speed of the screen 18 is decreased by operating the second brake 26. On the other hand, when the winding speed of the screen 18 does not reach a level above a given level at a final stage in case that the screen 18 is wound from the intermediate position between the uppermost and the lowest position in a vertical direction, a high centrifugal force is not applied to the clutch piece 50. Therefore, the clutch piece 50 is not opened to the maximum. The engaging portion 50a cannot be engaged with the brake pin 40a. Accordingly, the rotary brake 38 is not operated. In such a way, since the second brake 26 is operated, the screen 18 is prevented from being excessively decreased so that a screen can be still wound to the end.

When the engagement of the engaging portion 50a of the clutch piece 50 with the brake pin 40a is released by rotating the clutch case 32 in the rewinding direction of the screen, the clutch piece 50 is closed toward the inside of clutch case 32 by the spring force of the spiral spring 57 so that the clutch piece returns to a state shown in FIG. 6.

In such a way, the second brake 26 is operated only when the winding process is in a final stage of the winding of the screen and the winding speed of the screen is more than a given level.

Figure 8:
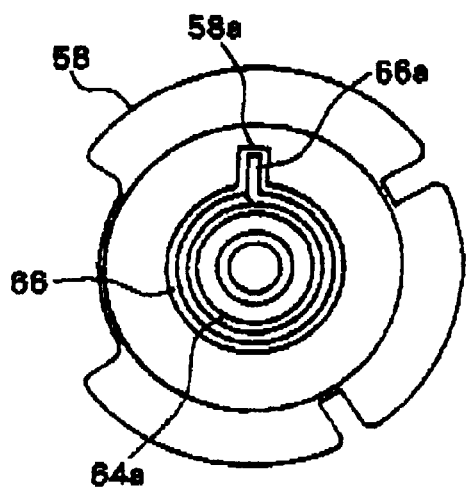
FIG. 8 is a view taken from a direction of arrow 8 of the clutch case shown in FIG. 7.

Referring to FIG. 7 and FIG. 8, a third embodiment of the invention is explained. In the drawings, parts referred to the same reference numbers designate similar parts, wherein an detailed explanation about these parts is omitted.

A clutch case 58 according to the present embodiment includes a clutch piece 50 rotatably attached to a body of the clutch case by pin 61, and a spiral spring 62 wound about the pin 61 for always pushing the clutch piece 50 in such a manner that the clutch piece 50 is pulled toward the center axis of the clutch case 32, in the same manner as the second embodiment. The inside of clutch case 58 on the reverse side to the brake section 34 houses a slip ring 64. A central hole of slip ring 64 alone is screwed to be threadably engaged with the screw shaft 30. Further, a clutch spring 66 is inserted between an outer periphery of a boss 64a of the slip ring 64 and an inner periphery of the clutch case 58. One end 66a of the clutch spring 66 is inserted into a notch 58a provided at a point on the inner periphery of the clutch case 58.

Further, an end portion of screw shaft 30 is formed of a nonscrew part 70 having no thread. The outer diameter of the nonscrew shaft 70 is set to be equal to that of a top part of the thread of the screw shaft 30. The nonscrew shaft 70 and the clutch spring 66 form a positioning mechanism for positioning the clutch case 58 in the axial direction within the winding pipe 16.

In the same manner as the first embodiment, when the winding pipe 16 is rotated in the winding direction of the screen, the clutch case 58 is moved to the right direction. The clutch piece 50 is engaged with brake pin 40a, and the brake section 34 is operated in a final stage of winding, by which a winding speed of the screen is decreased. In this time, when the clutch case 58 reaches the most rightward end of the screw shaft 30 in FIG. 7, the slip ring 64 is stopped there since the cluck case 58 cannot transit to the nonscrew shaft 70 and the slip ring 64 cannot rotate any more. On the other hand, since the clutch case 58 is rotated continuously together with the winding pipe 16 in the winding direction, the end 66a of the clutch spring 66 is pushed in such a direction that the clutch spring 66 is loosened so that the clutch spring 66 idle together with the clutch case 58 relative to the slip ring 64. In such a way, when the screen 18 is completely wound finally, the clutch case 58 is positioned at the end of the screw shaft 30. When the clutch case 58 is rotated together with the winding pipe 16 in the rewinding direction, the clutch spring 66 is engaged with the slip ring 64 by pushing the end 66a of the clutch spring 66 in such a direction that the clutch spring 66 is tightened, and moved along the screw shaft 30 in the left direction while the clutch case 58 and the slip ring 64 are rotated together.

In such a way, a position of the clutch case 58 is corrected each time the screen 18 has been completely wound on the winding pipe 16.

In each of the above described embodiments, an oil brake is used as the rotary brake. However, this invention is not restricted to this. A centrifugal brake can be used, for example a centrifugal brake described in Published Japanese Unexamined Utility Model Application No. 24893 of 1984 (Showa 59), wherein this centrifugal brake is comprised of a fist rotating body which is rotated in the same direction as that of the winding pipe when the clutch case is engaged with the brake pin, a second rotating body which is rotated in the different direction or at the different speed from the first rotating body, a centrifugal member attached to the second rotating body, and a braking member provided between the centrifugal member and the first rotating member.

Further, first brake 22 may be always operated as described, but can be formed to be operated only in the the winding of the screen by providing a clutch mechanism. Otherwise, the first brake 22 may be a centrifugal brake in the same manner as the second brake 26.

What is claimed is:

1. A roll screen assembly comprising:
   side plates;
   a winding pipe rotatably supported on said side plates;
   a spring mounted in said winding pipe;
   a roll screen to be wound on said winding pipe by the accumulated force of said spring;
   a decreasing mechanism mounted in said winding pipe, said decreasing mechanism comprising:
      a section that decreases a winding speed of said roll screen from a final stage of a winding of said roll screen prior to said roll screen being completely wound up; and
      an operating mechanism that determines the screen being in the final stage based on the rotation of the winding pipe, and for operating said section in the final stage.

2. The roll screen assembly according to claim 1, further comprising a second decreasing mechanism mounted in said winding pipe for decreasing a winding speed of the roll screen from a starting state of the winding of the roll screen.

3. The roll screen assembly according to claim 1, wherein said decreasing mechanism decreases a winding speed of the roll screen from the final stage a selected winding speed.

4. The roll screen assembly according to claim 1, wherein said operating mechanism comprises a screw shaft fixedly supported on one of said side plates and a clutch case which is mounted in the winding pipe so as to be movable in the axial direction but unrotatable relative to the winding pipe and which can be moved along the screw shaft together with rotating of the winding pipe, wherein the clutch case is engaged with the decreasing mechanism from said final stage of the winding of the roll screen to operate the decreasing mechanism.

5. The roll screen assembly according to claim 4, wherein said decreasing mechanism comprises a rotary brake, and a brake case which houses the rotary brake and has a brake pin which extends in an axial direction toward the clutch case, wherein when the clutch case in engaged with the brake pin, the rotary brake is activated.

6. The roll screen assembly according to claim 5, wherein the clutch case comprises a clutch piece having one end side which is rotatably attached to a body of the clutch case and another end side provided with an engaging portion to be engaged with said brake pin, a spring which always pushes the another side of the clutch piece toward an outside of the clutch case, wherein said engaging portion can be engaged with the brake pin only when the clutch case is rotating in the direction of the winding of the screen.

7. The roll screen assembly according to claim 5, wherein the clutch case comprises a clutch piece having one end side rotatably attached to a body of the clutch case and another end side provided with an engaging portion to be engaged with the brake pin, a spring which always pushes the another end side of the clutch piece toward a center axis side of the clutch case, wherein the clutch piece is moved toward an outside direction of the clutch case against a spring force of the spring by a centrifugal force generated by the rotation of the winding pipe, by which the engaging portion of the clutch piece can be engaged with the brake pin only when a winding speed of the screen is greater than a predetermined winding speed.

8. The roll screen assembly according to claim 4, further comprising a positioning mechanism for positioning the clutch case in an axial direction relative to the winding pipe when the screen is completely wound.

9. The roll screen according to claim 8, wherein said positioning mechanism includes an unthreaded shaft which is formed integrally with the screw shaft, wherein the clutch case is moved from the screw shaft to the unthreaded shaft immediately before a screen is completely wound.

10. The roll screen according to claim 9, wherein said positioning mechanism further comprises a push-spring for pushing back the clutch case on the unthreaded shaft toward the screw shaft.

11. The roll screen according to claim 8, wherein said positioning mechanism comprises an unthreaded shaft portion which is found at an end portion of the screw shaft and prevents the movement of the clutch case, a clutch spring which is mounted inside of the clutch case and inserted between a slip ring engaged with said screw shaft and the clutch case, wherein said clutch spring makes the clutch case idle in the winding direction of the winding pipe at an end portion of the screw shaft relative to the slip ring.

12. A roll screen assembly comprising:
    side plates;
    a winding pipe rotatably supported on said side plates;
    a spring mounted in said winding pipe;
    a screen to be wound on said winding pipe by the accumulated force of said spring;
    a decreasing mechanism mounted in said winding pipe for decreasing a winding speed of said screen prior to a final stage of a winding of said screen
    said mechanism comprising:
        a section that further decreases the winding speed of said screen in the final stage; and
        an operating mechanism that determines the screen being in the final stage based on the rotation of the winding pipe, and for operating said section in the final stage.

13. A roll screen assembly comprising:
    side plates;
    a winding pipe rotatably supported on said side plates;
    a spring mounted in said winding pipe;
    a screen to be wound on said winding pipe by the accumulated force of said spring;
    a decreasing mechanism mounted in said winding pipe for decreasing a winding speed of said screen during a winding of said screen
    said mechanism comprising:
        a section that further decreases the winding speed of said screen in the final stage; and
        an operating mechanism that determines the screen being in the final stage based on the rotation of the winding pipe, and for operating said section in the final stage.

14. A roll screen assembly comprising:
    side plates;
    a winding pipe rotatably supported on said side plates;
    a spring mounted in said winding pipe;
    a screen to be wound on said winding pipe by the accumulated force of said spring;
    a mechanism for decreasing a winding speed of said screen from prior to a final stage of a winding of said screen, said mechanism comprising:
        a section that further decreases the winding speed of said screen in the final stage, and
        an operating mechanism that determines the screen being in the final stage based on the rotation of the winding pipe, and for operating said section in the final stage to further decrease the winding speed of said screen.

15. A roll screen assembly comprising:
    side plates;
    a winding pipe rotatably supported on said side plates;
    a spring mounted in said winding pipe;
    a screen to be wound on said winding pipe by the accumulated force of said spring; and
    a decreasing assembly mounted in said winding pipe for decreasing a winding speed of said screen from a final stage of a winding of said screen, said decreasing assembly comprising:
        a screw shaft fixedly supported on the side plate;
        a clutch case which is mounted in the winding pipe so as to be movable in the axial direction but unrotatable relative to the winding pipe and which can be moved along the screw shaft together with a rotating of the winding pipe; and
        a brake section which is disposed on an end side of the screw shaft and which has a rotary brake, wherein the clutch case is engaged with the brake section, the brake section is operated.

16. A roll screen assembly comprising:
    side plates;
    a winding pipe rotatably supported on said side plates;
    a spring mounted in said winding pipe;

a screen to be wound on said winding pipe by the accumulated force of said spring;

a decreasing assembly mounted in said winding pipe for decreasing a winding speed of said screen from a final stage of a winding of said screen, said decreasing assembly comprising:
   a screw shaft fixedly supported on the side plate;
   a clutch case which is mounted in the winding pipe so as to be movable in the axial direction but unrotatable relative to the winding pipe and which can be moved along the screw shaft together with rotating of the winding pipe; and
   a brake section which is disposed on an end side of the screw shaft; and
a positioning mechanism for positioning the clutch case in an axial direction relative to the winding pipe when the screen is completely wound.

* * * * *